US008849720B2

(12) United States Patent
Nestor et al.

(10) Patent No.: US 8,849,720 B2
(45) Date of Patent: Sep. 30, 2014

(54) ENTERTAINMENT EVENT TICKET PURCHASE AND EXCHANGE SYSTEM

(75) Inventors: Tod A. Nestor, Wexford, PA (US); Robert Patrick, Thurmont, MD (US); Benito Cianciaruso, Coconut Creek, FL (US)

(73) Assignee: Global eTicket Exchange Ltd., Wexford, PA (US)

( * ) Notice: Subject to any disclaimer, the term of this patent is extended or adjusted under 35 U.S.C. 154(b) by 104 days.

(21) Appl. No.: 13/104,073

(22) Filed: May 10, 2011

(65) Prior Publication Data

US 2011/0238454 A1  Sep. 29, 2011

Related U.S. Application Data

(62) Division of application No. 10/239,425, filed as application No. PCT/US01/09146 on Mar. 22, 2001, now abandoned.

(51) Int. Cl.
| | |
|---|---|
| G06F 21/00 | (2013.01) |
| G06Q 10/02 | (2012.01) |
| G06Q 20/04 | (2012.01) |
| G06Q 30/06 | (2012.01) |
| G07F 17/00 | (2006.01) |
| G07F 17/42 | (2006.01) |
| G07B 15/00 | (2011.01) |

(52) U.S. Cl.
CPC ............... *G06Q 30/06* (2013.01); *G06Q 10/02* (2013.01); *G06Q 20/045* (2013.01); *G07F 17/0014* (2013.01); *G07F 17/42* (2013.01); *G07B 15/00* (2013.01)
USPC ............................. 705/59; 705/26.1; 705/37

(58) Field of Classification Search
CPC ........................... G06Q 30/0601; G06F 21/10
USPC ..................... 705/26, 37, 59, 64, 65, 26.1
See application file for complete search history.

(56) References Cited

U.S. PATENT DOCUMENTS

| 5,598,477 A | 1/1997 | Berson |
|---|---|---|
| 6,023,685 A | 2/2000 | Brett et al. |

(Continued)

FOREIGN PATENT DOCUMENTS

| EP | 0950968 A1 | 10/1999 |
|---|---|---|
| EP | 0969426 A1 | 1/2000 |
| WO | 99/26203 A1 | 5/1999 |

OTHER PUBLICATIONS

Definition for "schema", Microsoft Press, Microsoft Computer Dictionary, Fifth Edition, 2002, p. 465.*

(Continued)

*Primary Examiner* — Ryan Zeender
*Assistant Examiner* — Hunter Wilder
(74) *Attorney, Agent, or Firm* — Buchanan Ingersoll & Rooney PC

(57) ABSTRACT

An electronic ticket exchange system has a market-making system by which patrons submit bids over a limited time period for seats of different quality. A trading system provides for a secondary market in which patrons who have purchased tickets for an event can sell them to other patrons. All of the rights associated with a ticket, such as entry into the venue, are stored in electronic form. An electronic venue entry control system verifies that a person owns an electronic ticket property right, and authorizes the privileges associated with the ticket, such as entry to the venue. A seating system is employed to determine an optimal seating configuration based upon patron-specific preferences, after the initial sale of tickets and prior to entry into the venue.

25 Claims, 4 Drawing Sheets

(56) References Cited

U.S. PATENT DOCUMENTS

| | | | |
|---|---|---|---|
| 6,067,532 A * | 5/2000 | Gebb | 705/37 |
| 6,068,183 A | 5/2000 | Freeman et al. | |
| 6,119,096 A * | 9/2000 | Mann et al. | 705/5 |
| 6,175,922 B1 | 1/2001 | Wang | |
| 6,216,227 B1 | 4/2001 | Goldstein et al. | |
| 6,223,166 B1 | 4/2001 | Kay | |
| 6,240,396 B1 | 5/2001 | Walker et al. | |
| 6,496,809 B1 | 12/2002 | Nakfoor | |
| 6,738,750 B2 * | 5/2004 | Stone et al. | 705/5 |
| 6,842,741 B1 * | 1/2005 | Fujimura | 705/59 |
| 6,910,627 B1 | 6/2005 | Simpson-Young et al. | |
| 7,003,485 B1 | 2/2006 | Young | |
| 7,031,945 B1 * | 4/2006 | Donner | 705/64 |
| 7,206,755 B1 * | 4/2007 | Muralidhar | 705/26.43 |
| 7,228,313 B1 | 6/2007 | Hand et al. | |
| 2003/0093387 A1 * | 5/2003 | Nakfoor | 705/65 |
| 2004/0015404 A1 | 1/2004 | McCarthy | |

OTHER PUBLICATIONS

European Examination Report, dated Apr. 14, 2010, issued in EP Appln. No. 01 926 404.3.

* cited by examiner

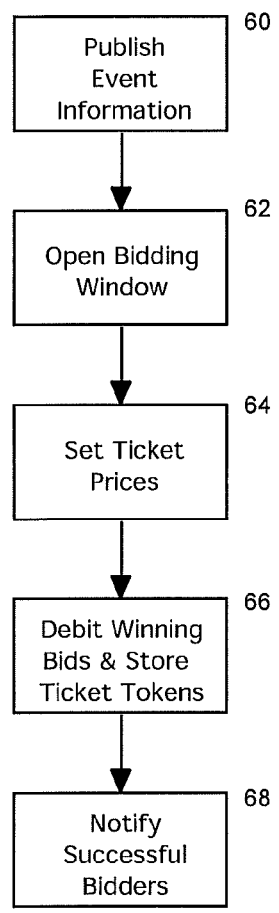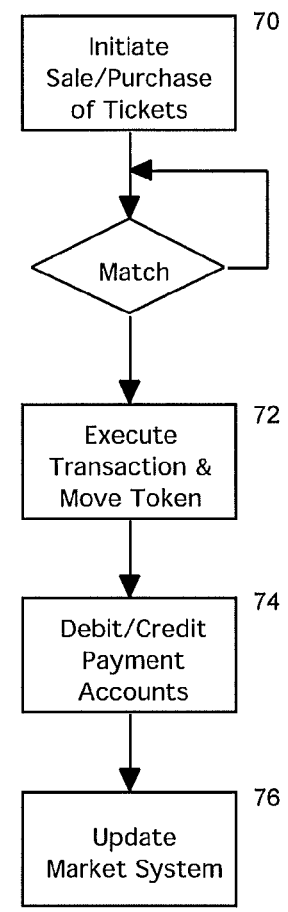
Fig. 5
Fig. 6

ENTERTAINMENT EVENT TICKET PURCHASE AND EXCHANGE SYSTEM

FIELD OF THE INVENTION

The present invention is generally directed to the sale and use of tickets for entertainment events, such as sporting events, performances, concerts, and the like, and more particularly to an electronic ticket exchange system which maximizes the revenue that artists, promoters and/or entertainment venue owners can receive from events, while at the same time facilitating the ability of patrons to obtain and trade electronic tickets as desired, as well as to gain entry to entertainment events.

BACKGROUND OF THE INVENTION

Most entertainment events require the attendees of those events to purchase a ticket in order to gain entry into the venue at which the event is being held. Conventionally, there are various avenues by which patrons can obtain tickets. One such avenue is to purchase them directly at the site of the venue itself, for example immediately prior to the event, at a pre-established face value. For popular events, it is desirable to purchase the tickets ahead of time, particularly if the event is likely to be sold out or preferential seating is desired. In such a situation, it may be inconvenient to travel to the venue at such an earlier time. In many cases, therefore, it is possible to obtain tickets through a ticket agent. Typically, such purchases can be made telephonically, via the Internet, or at distributed ticket sales locations that are more convenient to the potential attendees. Generally, the ticket agent has an ongoing relationship with the event venue, by which the venue owner authorizes the ticket agent to sell and distribute paper tickets for the individual events to be held at the venue. In some cases the ticket agents handle all of the tickets for an event, whereas in other cases they may only sell excess tickets that the venue owner is not able to directly sell. In these arrangements, the ticket agent may charge the patron a handling and/or distribution fee.

The third avenue for the patron is to obtain tickets through a third-party broker who purchases a number of tickets, usually for popular events, and resells them to the patrons. Quite often, the tickets are resold at a price which is significantly above the face value of the tickets. Typically, a broker may bundle the ticket with travel arrangements, memorabilia, etc., to justify the increased price of the total package provided to the buyer. All of the profit that results from selling the tickets at a higher value remains with the broker; none of it flows back to the venue owner.

As a fourth mechanism, individuals may buy tickets from the original purchasers, and resell them to others at a significantly higher price. These individuals are sometimes known as "scalpers". Again, all of the profit from the higher price remains with the scalper, rather than flowing back to the venue owner, promoter or artist. These activities are usually illegal, and can be found almost anywhere.

Currently, prices for event tickets are fixed well prior to the event. Depending upon the popularity of the event, the venue may be full to capacity, empty, or partially filled at the time of the event. For highly popular events in which the venue is filled to capacity, the venue owner may not realize the maximum potential revenue for that event, because the patrons may have been willing to pay more, as evidenced by the existence of brokers and scalpers. Conversely, when the demand for an entertainment product is much lower, such as in the case of losing athletic teams, less popular acts, and the like, the tickets may be overpriced, resulting in lower attendance. By lowering the prices for the tickets, it is likely that more people will attend the event, resulting in more seats being filled. Even though the revenue per ticket may be lower in such a case, ancillary benefits arise from the ability to offer a fair value for lower-demand entertainment events. For instance, there is likely to be increased loyalty to the venue owner, or team, since the patron only paid the perceived value of the entertainment. In addition, increased sales from non-ticket revenue sources, such as parking, concessions, merchandise sales, and the like, will likely result from the increased attendance. These non-ticket sources of revenue are generally quite profitable, since the incremental cost necessary to accommodate increased attendance is relatively minimal.

In the conventional arrangement, one physical ticket, e.g., a paper ticket, is generated for each available seat at a venue, and each attendee is required to present a ticket to gain entrance to the venue. This requirement for physical possession of tickets places a restriction on the patron's ability to freely exchange tickets, particularly as the time of the event draws near. Typically, if a purchaser of a ticket is unable to attend the event, he or she may attempt to sell it or give it to an acquaintance, broker or scalper. In some cases, the purchaser may attempt to dispose of the ticket through an online auction site. However, this procedure has time constraints, since the seller must be able to physically deliver the ticket to the purchaser in time for it to be received prior to the event. Often, the purchaser is left with the option of simply forfeiting the cost of the ticket, or reselling it to a broker, usually at a substantial discount to its fair market value.

SUMMARY OF THE INVENTION

It is an objective of the present invention to provide a system for the sale, exchange and use of tickets which enables a venue owner to maximize the potential revenue that can be achieved with each event. It is a further objective of the invention to provide a system which eliminates the need for physical bearer-type tickets, and thereby facilitate the patron's ability to more easily exchange tickets.

In accordance with the present invention, these objectives are achieved by means of an electronic ticket exchange system by which venue owners can sell tickets to patrons at a fair market value for each event, and the patrons can more easily trade and transfer the tickets among one another after they have been purchased from the venue owner. Tickets for an event are initially offered to the public by the venue owner, using a market-making system. In this system, patrons submit bids over a limited time period, for seats of different quality. Once the limited bidding period expires, an initial price is established for each quality of seat, on the basis of the submitted bids and an econometric model that takes into account certain constraints and other factors. The tickets are then sold to the public at that price. Thus, the owner is able to establish a fair-market value for each quality of seat at each event, rather than being locked into a pricing structure that may not optimize profits for the owner.

Another feature of the invention is a trading system which provides for a secondary market in which patrons who have purchased tickets for an event can readily sell them to other patrons, without requiring the services of a broker or the like. The ability to freely exchange tickets is facilitated by the fact that physical tickets are not required. Rather, all of the rights associated with a ticket, such as entry into the venue, parking privileges, designated seating, etc., are stored in a electronic form. Hence, all trading can be performed electronically, using various methods, without the need to exchange any physical material between the buyer and the seller.

Coupled with the electronic ticket, the invention provides an electronic venue entry control system. Upon presentation of one of various predetermined forms of unique identification, the control system verifies that a person owns an electronic ticket property right, and then authorizes the privileges associated with the ticket, such as access to parking facilities, entry to the venue, purchase of concessions and/or merchandise, and the like. As a further feature, specific seats are not assigned at the time the tickets are purchased. Rather, a seating system is employed to determine an optimal seating configuration based upon patron-specific preferences, after the initial sale of tickets and prior to entry into the venue. The specific assigned seats are then indicated to the ticket holder at the time of entry.

In a preferred implementation of the invention, patrons who regularly purchase tickets become members of an organization associated with the ticket exchange system. All transactions carried out within the system can then be easily accomplished through a single membership number, which is permanent and unique to the member. Each such member can be provided with a contactless card, or suitable mechanism which interfaces with the entry system to provide access to the venue, and parking if appropriate. Examples of such include key fobs, PDAs, cellular telephones, and other such devices which can store and transmit the unique member identification. The identification device can also be used to make purchases of merchandise, concessions, parking and the like at the venue. Non-members can also utilize the system, and gain access through temporary membership numbers that are unique to an individual event.

These and other features of the invention are described in detail hereinafter, with reference to the accompanying drawings.

BRIEF DESCRIPTION OF THE DRAWINGS

FIGS. 5-8 are flowcharts of operations which occur with the electronic ticket exchange system.

DETAILED DESCRIPTION

The present invention comprises an electronic ticket exchange system that can be employed in connection with any type of entertainment event in which proof of entitlement to entry, such as a ticket or the like, must be given to provide a patron with access to the event. To facilitate an understanding of the principles which underlie the invention, it will be described hereinafter with occasional reference to its application in the context of particular examples of entertainment, such as sporting events. It will be appreciated, however, that the practical applications of the invention are not limited to these specific examples. Rather, its general applicability to all types of entertainment events will be apparent from an understanding of the following description.

Figure 1:
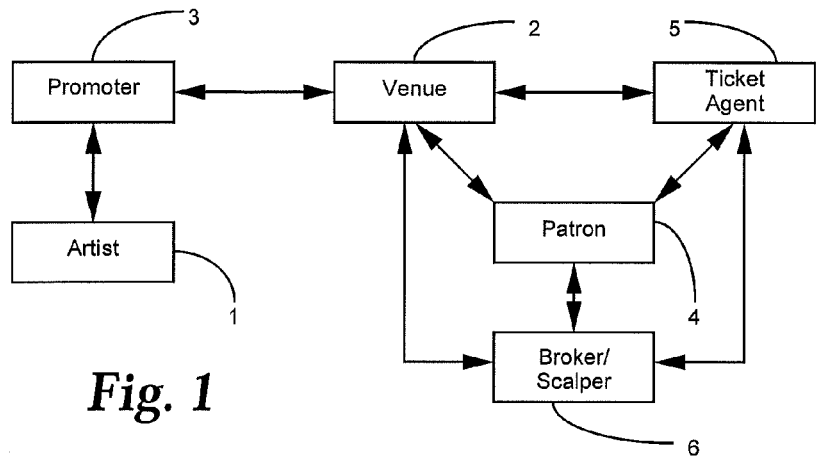
FIG. 1 is a block diagram illustrating the relationship of parties involved in conventional entertainment events.

A number of different entities may be involved in entertainment events. These entities, and their conventional relationship to one another, are depicted in the block diagram of FIG. 1. Typically, an entertainment event is defined as a presentation by an artist 1 at a venue 2 at a designated date and time. Depending upon the nature of the event, the artist could be an athletic team or individual athletes, a band, actors and/or actresses, or other types of performers. Similarly, the venue could be an athletic stadium, a hall or concert center, a golf course, or other suitable form of property where access to an event is controlled. Typically, a promoter 3 creates interest in the event to entice attendance by spectators. The promoter may be responsible for scheduling the venue, negotiating contracts, and handling the various administrative tasks associated with the entertainment event. Depending upon the type of entertainment, the artist, promoter and venue owner could all be closely related, or could be independent of one another. In the case of athletic teams, for example, the venue owner and the promoter may be the same entity.

The patrons 4 are those people who purchase tickets in order to observe, enjoy and participate in the entertainment being provided. The patrons can be individuals, corporations, traders and the like. They could also be any one or more of the artist, venue owner and promoter themselves, who may distribute the tickets as gifts or promotional offers.

Ticket agents 5 are third parties whom the venue owners engage to sell and distribute tickets to entertainment events, in lieu of, or in addition to, directly selling the tickets themselves. Brokers and scalpers 6 are third-party traders who purchase tickets, primarily for popular events, and resell them to patrons at prices that are typically greater than, but sometimes less than, the face value of the tickets. The brokers can be small-scale businesses, such as ticket broker agencies, or individuals. Scalpers are typically individuals. The brokers and scalpers may obtain the tickets directly from the venue, or from ticket agents, or from patrons.

Figure 2:
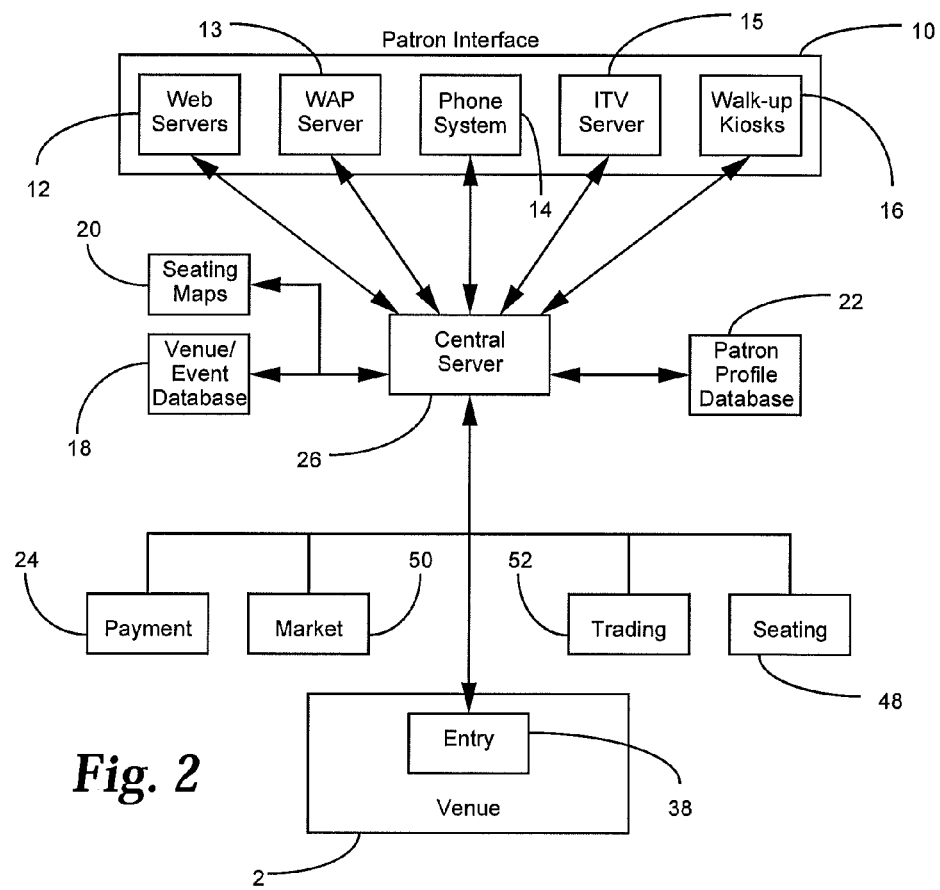
FIG. 2 is a general block diagram of the major components of an electronic ticket exchange system in accordance with the present invention.

In accordance with the present invention, an electronic ticket exchange system replaces the functions of the ticket agents 5 and brokers 6, and offers added value to the venue owner and the patron. The electronic ticket exchange system is sponsored by the venue owners. The basic components of the electronic ticket exchange system are illustrated in the block diagram of FIG. 2. The electronic ticket exchange system includes a patron interface 10 by which patrons can purchase tickets for desired events, as well as trade purchased tickets with other patrons. A patron's access to the system can be obtained by a variety of different means. For example, the patron can interact with the system by means of the Internet, using a standard web browser, PDA, or the like. For this purpose, the interface is supported by web servers 12 for transmitting the appropriate HTML pages, or the like, to permit the patron to view information regarding available events and enter requests for tickets. To accommodate patrons who access the internet via cellular phones or other wireless devices, the web servers can include one or more wireless access protocol (WAP) servers 13. Alternatively, the patron can perform these operations by means of a telephone system 14 or an interactive television system 15 which also forms part of the patron interface 10. In a telephone system access, the patron might speak to a live operator, or use an automated menu system to obtain information and enter requests. As a further component, the patron interface might include several walk-up kiosks 16 at distributed locations, for example in shopping malls, retail outlets, convenience stores, and the like. Such kiosks can also be located at the site of the venue itself, for direct access by the patrons or operation by ticket sales personnel at the venue's box office. Alternatively, the venue box office can sell and trade tickets via a web browser interface.

The patron interface 10 enables the patron to perform three fundamental types of operations, namely (1) to obtain information about events at one or more venues affiliated with the system, (2) purchase tickets to desired events, and (3) exchange tickets among multiple patrons. In addition, the patrons may be able to order merchandise and other goods, link to related sites, etc. Information regarding the events that are scheduled for the affiliated venues is stored in a venue/event database 18. When a patron first accesses the system via the interface 10, a list or menu of the affiliated venues or events can be provided, to permit the patron to make a selection. Preferably, the views presented by the interface are customizable, so that the patron can view all venues and then select a specific event, or view all events and then select an appropriate venue. Seating maps 20 for the affiliated venues are stored in conjunction with the database 18. Once the user has selected a particular venue and event, the appropriate seating map can be displayed to permit the patron to assess the relevant information for various categories of seating quality, when either the Internet access or the walk-up kiosks are employed. In the case of telephone access, the seating map can be displayed to the telephone operator.

In a preferred implementation of the invention, the patrons who access the system are members of an organization affiliated with the system. A profile of information pertaining to each member is stored in a database 22. Each profile might include, for example, a credit card, bank account, or other source of funds that are to be used when tickets are purchased, seating preferences, group memberships, and the like. When the patron purchases tickets for a particular event, information regarding the method of payment is retrieved from the database 22 and forwarded to a payment system 24. At the same time, information is recorded which indicates that the user has purchased one or more tickets for the event. This information could be stored in the patron profile database 22, or the venue/event database 18, or both.

The payment system 24 processes all of the monetary transactions which occur within the ticket exchange system. When a need to confirm a request to purchase tickets occurs, the price of the tickets is forwarded to the payment system 24, where it is debited against the form of payment which has been established by the patron, e.g. credit card, debit card, cash balance on deposit, designated checking account, etc. If desirable, the payment system can ensure that the proper funds are available and confirm that fact to a central server 26 before the transaction is completed.

The payment system 24 can also be used to facilitate other types of purchases by the patron. As described previously, the patrons who access the ticket exchange system can be members of an organization. Their membership can be indicated by means of a membership card or a token which serves as an identification device. The membership identification device can take any of a variety of forms, and preferably is one which is capable of electronically, optically or magnetically storing a membership identification number and transferring that number to a transaction device, through either physical contact or in a contactless manner. Examples of suitable identification devices include smart cards, magnetic stripe memory cards, RFID devices such as key fobs, tags, watches, etc., barcoded tags and the like, personal digital assistants (PDAs), wireless telephones, and biometric features. Whenever the member makes a purchase at the venue, the identification device can be used to debit the member's account via the payment system, in lieu of cash. Thus, the identification device can be used to pay for parking at the venue, as well as purchase concessions, services and merchandise while attending an event.

Figure 3:
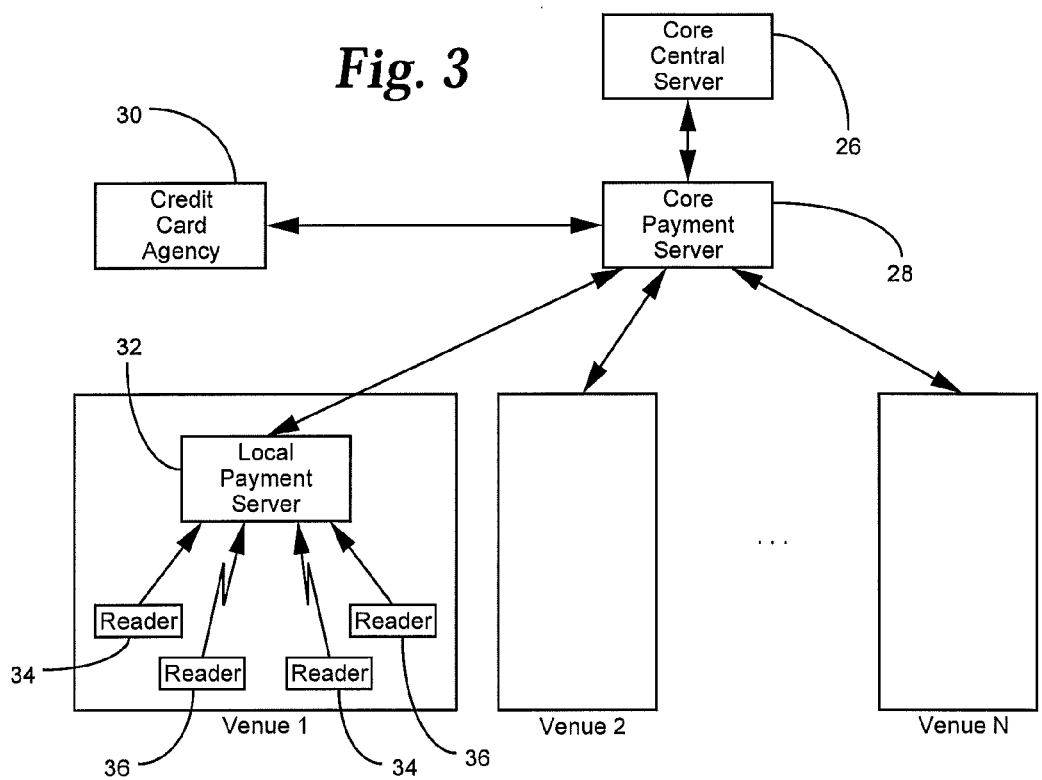
FIG. 3 is a block diagram of the payment system.

A more detailed illustration of the implementation of the payment system is illustrated in the block diagram of FIG. 3.

A core payment server 28 communicates with the central server 26 and receives information regarding ticket purchases by patrons. The amounts of purchases are forwarded to a bank card processing agency 30, which verifies the patron's credit or debit card and provides an authorization code for the transaction. In the case of a cash balance on deposit, or pre-approved credit limits, the verification can be performed internally within the server 28.

Local payment servers 32 can be located at each of the individual venues. The local servers communicate with identification device readers 34 at the concession stands and other points of sale. In the case of parking payments, the parking facilities can be equipped with portable readers 36 which communicate with the local servers via radio wave communication. The local servers 32 receive information as purchases are made, and forward this information to the core payment server 28. The communication of this data to the primary server can occur in real time, or in a batch mode on a regular basis. In the case of real-time mode operation, it may be preferable for the local servers to communicate directly with the credit card agency 30, to authorize transactions as they are being made. The core payment server 28 consolidates all of the transaction information to provide reports to the patrons regarding the activity on their accounts. Preferably, the patrons can access these reports via the web access server 12.

An associated advantage that arises from the use of the membership identification devices to make purchases is the fact that it permits the detailed item transaction data to be collected for later mining and analysis. For instance, the venue owners can determine the types of merchandise, food and drinks that are the most popular at different types of events. This data can even be categorized according to quality of seating section, so that the various concession stands are stocked appropriately. It also facilitates the ability to target various groups of patrons, and direct actionable marketing to them on a real-time basis.

One of the principle advantages of the electronic ticket exchange system of the present invention is the fact that physical tickets are not required to gain entry into the entertainment venue. Rather, the patron's purchase of a ticket is electronically stored in the system, e.g. in the databases 18 and/or 22, and identifies the patron's right to enter the venue for a specific event. To this end, another component of the ticket exchange system is an entry system 38 located at each affiliated venue. Upon arrival at the venue, the patrons need only present suitable forms of identification which confirm that they are the persons having electronic tickets registered in the system. In the preferred implementation of the invention in which the patrons possess membership identification devices, those devices can be used to gain entry to the venue, as well as make purchases as described previously. Hence, a single membership identification device can be re-used at all of the venues which are affiliated with the electronic ticket exchange system.

Figure 4:
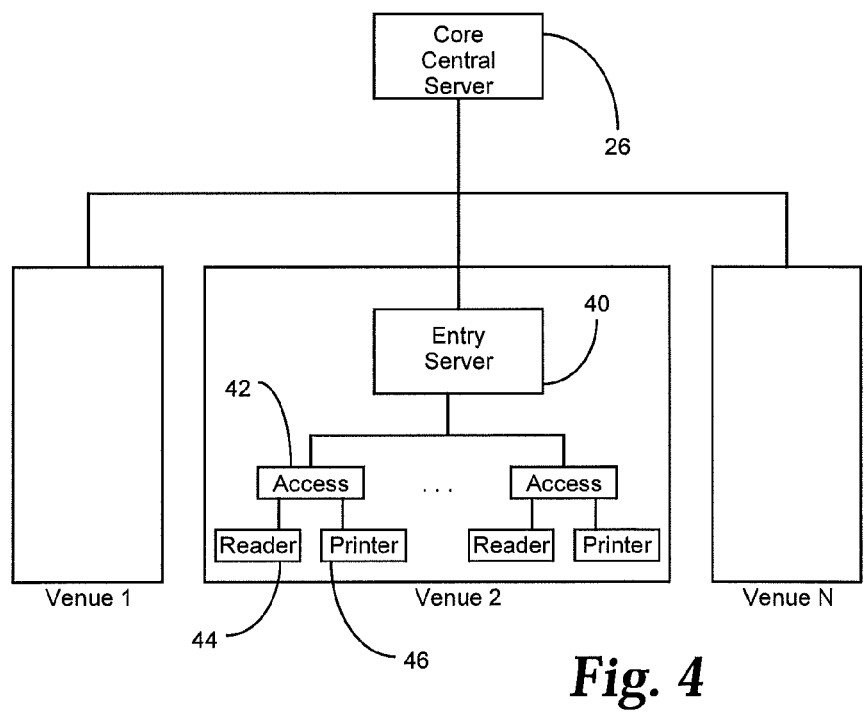
FIG. 4 is a block diagram of the entry system.

A more detailed illustration of the entry system is illustrated in FIG. 4. Each venue has one or more entry servers 40 affiliated with it. Preferably, the entry server is located at or very near the site of the venue, and communicates with the central server 26 to receive data regarding those patrons whose records indicate that they possess an electronic ticket for admission to a given event at that venue, as well as guaranteed parking and other rights associated with an electronic ticket.

An access-control device 42 is connected to the server 40 to provide admission to the venue upon presentation of the proper identification. Depending upon the number of entry locations at the venue, a multiplicity of such entry devices may be employed. Each device is equipped with a reader 44 to receive the appropriate information from the attendee's identification device, and provide the patron's identity to the server 40 to confirm ownership of the proper electronic ticket for the event. Upon receipt of confirmation from the server, approval is given to permit entry. Depending upon the nature of the access-control device, the approval can take different forms. For example, in one implementation the access-control device can be turnstile or other mechanically-controlled gate. In this case, the approval can be release of the gate to permit one person to pass. In another instance, the access control might be manually enforced, such as a rope that is controlled by a security person. In this case, the approval could simply be a message on a screen, or a colored light to indicate whether a person should be permitted to pass, or stopped.

Alternative forms of identification might be employed for attendees who do not possess membership identification devices. For example, a barcoded paper or card might be issued when the ticket is purchased, or the attendee might provide a driver's license number or social security number. A suitable barcode reader and/or keypad can be included with the access-control device for each of the possible types of input.

Since the admission to the venue does not require possession of a physical ticket, if general seating is not to be employed it may be desirable to provide each patron with an identification of the particular seat that has been assigned to that person. For this purpose, a printer 46 can be located in the device to print a simple paper ticket which indicates the date, seat number, event name, and the like, for use by the patron to present to an usher and/or locate the seat.

For most venues, such as athletic stadiums, concert halls, and the like, the entry system is likely to be permanently installed at the venue. Certain types of events, however, take place at different locations where it may not be practical to install such a system on a permanent basis. Examples of such include golf tournaments, automobile races, wrestling events, tennis matches, outdoor concerts, and the like. To facilitate the use of the electronic ticket system for these types of events, a portable entry system can be employed, to be set up at the venue for the duration of the event, and then removed thereafter.

One of the limitations associated with conventional physical ticket systems is the fact that seats are usually assigned at the time the tickets are purchased. This approach can result in less than optimal seating configurations, particularly for popular events. For example, a large group of people may not be able to purchase contiguous seats due to previous assignments of seats which are dispersed throughout a desired seating area. However, in the system of the present invention, it is not necessary to assign specific seats at the time the tickets are purchased. Rather, it is only necessary to record the fact that each of the patrons has purchased a particular level or quality of seating at the time of the purchase. The level or quality of seat can be based upon a number of factors, such as price and location. When a ticket is purchased, the patron can be informed of the gate or portal to be used when entering the venue, without reference to a particular seat.

At a suitable time prior to the event, a seating system 48 determines an optimal seating configuration for all of the tickets which have been purchased. This determination takes place on a continual basis, and is updated to reflect the trading of tickets and new patron preferences. The optimal configuration is based upon a set of parameters which are entered by the patron, such as quality of seats, number of contiguous seats, and preferences such as adjacent an aisle, close to an exit, etc. These parameters can be entered at the time the tickets are purchased, or some of them can be previously recorded as part of the patron's profile in the database 22. For each different quality of seats, the seating system assigns individual seats to the purchased electronic tickets. These seating assignments are sent to the entry system server 40 for the venue just before the doors or gates are opened for admission. When the patron enters the venue, the seating assignments are queried and printed, or otherwise provided to the patron. The dynamic assignment of seats in this manner provides greater flexibility, resulting in greater convenience to the patrons. For instance, even if a number of patrons purchase their tickets at separate times, they will still have the opportunity to all sit together if they have indicated that as a preference. This greater flexibility is likely to result in increased ticket sales.

Another of the principle advantages of the fact that a ticket is held in the system in electronic form, rather than requiring physical possession of tickets, is the ability to more freely exchange tickets among patrons. More generally, the system of the present invention facilitates the establishment of an open market for tickets, which enables their prices to be matched to the intrinsic value of the underlying event, in addition to fostering their transferability. In essence, the tickets can be bought and sold in a manner similar to the initial sale and subsequent trading of securities. The initial sale of the tickets, or initial offering, is conducted by the venue owner. Subsequent trading of the tickets takes place among the patrons, in a secondary market that is endorsed by the venue owners.

A hybrid of a Dutch auction approach (the lowest bid that still qualifies) and a regular auction approach can be used to set the initial price of tickets. Such a hybrid bidding approach is likely to result in optimal revenue generation for the venue owner, and be more akin to initial and direct public offerings that occur in stock markets, for each quality of seat section. For all types of tickets, including general admission, season tickets, luxury boxes, permanent seat licenses, and the like, the patrons can submit bids for the ticket related to that event, prior to the event's occurrence. This increased access to tickets is likely to result in additional demand and an increased market for tickets and to translate into higher market values for the tickets. A pricing window can be established for patrons to submit their bids. For example, the pricing window can be two weeks in length, but can vary anywhere from one day to a month or more, in dependence upon factors such as the type of event, venue owner preferences, and patron demand. This pricing window should preferably be coordinated with the venue owner's own advertising and promotional efforts for the event. By having a pricing window for bid submissions, patron inconveniences such as long lines, difficulty in accessing websites, and busy telephone numbers can be eliminated. The lead time and length of the window for submitting these bids can be co-determined by the ticket exchange system and the particular venue owner. Establishing a standard lead time for bid submissions is likely to provide behavioral benefits for the patrons. For example, if every venue owner requires bids to be submitted between four and six weeks prior to an event for general admission and/or eight to ten weeks prior to a season for season tickets, patrons will learn this process and become comfortable with this approach of selling tickets over time.

In addition to marketing efforts by the venue, promoter, etc., the system provides each patron with adequate information for each event so that the patron can make a well-informed bid for each event's ticket. This information could include such items as:

- comparable ticket selling prices for identical/similar recent events or events that are deemed to be similar, analogous to the approach used in the real estate market for providing guidance to homebuyers;
- market-determined prices, if available, for a specific venue along with the attendance at the venue for a particular event measured as a nominal amount and percent of capacity;
- ticket face values, if applicable, for a specific venue along with the attendance at the venue for a particular event measured as a nominal amount and as a percent of capacity;
- the most recent ticket market values and prior year ticket market values for the venue in question;
- a gate of entry for a given quality of seat upon which the patron is bidding;
- a minimum level bid price for each quality of seating section for each venue and each event;
- a list of marquee performers for each event at the particular venue. If the event is sports related, this could include an injury report and any important trade information;
- performance statistics of performers, if relevant;
- patron postings of performance reviews for an entertainment event;
- where relevant, current year and prior year won/lost records;
- timely press or newswire related articles about the event, marquee performers, and/or venue;
- audio and video links about an event to enhance the experience for the patron by providing a sense of participation in anticipation of the event prior to the event, and thereby create increased interest surrounding the event. Any other type of information which would assist the patrons in making informed bids can also be included.

In a preferred implementation, patrons submit "blind bids" during the pricing window so detailed pricing information about current bids for the event being sold will not be available to other patrons. By using a blind bid system, price gaming amongst patrons is much less likely to occur while the venue owner will be much more likely to receive the patron's best offer price, resulting in an optimal initial selling price for the tickets rather than the lowest common denominator that occurs in interactive auction approaches. Also, patrons have significantly less incentive to review their bids immediately prior to the close of the pricing window, resulting in a reduction in excessive peak period demands on the trading system since there is no minimum level bid to beat. However, some level of concise and simple real-time guidance might be provided to patrons. The optimal type and level of dynamic bidding information, such as pricing (e.g., range, etc.), volume, etc. to provide to patrons for the bidding process can be empirically determined.

In one embodiment, patrons can only place one active bid per quality of seating section, however they can place a bid in as many quality of seating sections as they desire. At the time a patron enters multiple bids, the patron will be required to indicate whether all of the bids are to be live (e.g., all bids that are above clearing price will be purchased) or if the patron only wants to purchase a ticket at the highest quality of seat for which a qualifying bid was submitted. Also, patrons can update, change, and/or cancel their bids at any time during the initial ticket pricing window period, up until the time the pricing window closes.

Once the pricing window closes, one singular selling price is determined for each quality of seat section, based upon the winning bids that were equal to or greater than the singular price all patrons in that section were willing to pay. By having one singular selling price, patrons are less likely to be upset about a purchase after it is made because everyone in their quality of seating section will have paid the same price. Those patrons who bid higher can be given higher priority with respect to their seating preferences. As long as a patron's bid is equal to or greater than the winning auction price, he or she will be guaranteed a ticket, absent any ties. If more patrons submit bids equal to the winning auction price than the number of available seats, resulting in the need to establish a tie breaker mechanism, a set of rules can be used to select the winning bidders. These rules could include: (1) timing of when the ticket was bid upon, with an earlier bid being better than later, (2) membership status of the patrons, (3) number of events purchased/traded through the system, (4) higher maximum bid levels during the initial sales period result in a higher preference, etc.

A market system 50 functions to establish each event's market value and the initial price for each quality of seating section, based upon the bids that were submitted. For example, the pricing could be determined in accordance with an econometric model that has as its primary objective to optimize the economic benefit for the venue owner (and any other parties that participate in ticket revenues, concession, and merchandise sales), while considering all of the most important and relevant tradeoffs and constraints impacting the economics for the event such as ticket revenues, concession and merchandise sales, television revenues, radio revenues, marginal costs for each additional ticket sold, etc. Once the initial ticket prices are established, and any necessary tiebreaker criteria considered, only patrons who have won a bid are notified of the success of their bids and the auction winning pricing for their bids. This notification is preferably sent within a few days of the bidding window closing, and the member's account is automatically billed through the payment system 24. Also, secondary trading is allowed immediately upon final determination and communication of the initial ticket selling price. The method for notification for each patron's winning bid can be as follows:

- if a final winning bid was submitted on the Internet, an email is sent to the email address stored in the database 22 for the member who won the bid;
- for final winning bids submitted in distribution channels other than the Internet: if available, an email is sent to the email address on record for the member; if an email address is not available, a notification is sent via automated voice response systems, first-class mail, pagers or the like;
- for situations where immediate notification is necessary, such as for playoff games, etc., a notice is first sent via e-mail, however when an e-mail address is not available the patron is notified via automated voice response systems, paging systems, or the like, if sending the notice out by first-class mail would not be timely;
- the patron's membership profile in the database 22 is automatically updated so that the patron can access the profile to determine the success or failure of a bid via the Internet, telephone, or the venue itself, if so preferred.

Since one of the system's primary objectives is to increase attendance, and not merely sell seats, a trading system 52 allows patrons to sell, trade or otherwise transfer their tickets in a fair, efficient and fully informed manner prior to an event, in case the patron cannot attend the event and desires to sell the ticket. It is preferable for the venue owner to sell a seat and have a person in attendance at the event because the individual who attends an event is likely to enjoy the entertainment experience and thereby build loyalty, as well as purchase parking, concessions, and possibly even merchandise, versus a situation where a patron does not attend and purchases nothing other than the seat. Furthermore, getting new patrons to attend an event when a season ticket owner cannot attend is more likely to result in additional merchandise sales because the new patron will not have likely purchased the merchandise in the past.

The trading system provides and facilitates a liquid and efficient market for secondary trading of tickets for events and venues. The liquidity for tickets will likely result in an additional incentive for patrons to purchase tickets to events and will likely translate into higher market value for these tickets. The secondary trading of tickets is analogous to the secondary trading that occurs for stocks, with unique identification symbols for each event (e.g., akin to a company's stock ticker); up-to-the-second posting of bid/ask spreads for each ticket for each event being sold; and a market trading system that matches various types of orders placed by sellers and buyers.

The trading system 52 functions purely as a broker providing a market that allows seamless trading of tickets by matching willing and informed buyers and sellers. When trades are made between patrons, the trading system communicates with the payment system 24, to appropriately debit and credit the accounts of the buying and selling patrons. Alternatively, a third-party payment system which facilitates consumer-to-consumer payments, such as PayPal.com or BillPoint.com, can be associated with the trading system to carry out the financial portion of the transaction associated with the trading of tickets. For each secondary market trade that is executed, there is a bid and ask (offer) price for the trade that must eventually converge to result in a match. Analogous to stocks, the level of the bid/ask spread is dependent upon the liquidity of the tickets related to the event in question, with more liquid trading resulting in smaller spreads.

The trade prices under an exchange approach where the trading system is acting as a broker result in a situation where the buyer and seller are paying the same market price, although not necessarily the same total price when fees are accounted for. The market price may be identical, yet the fees could vary for the buyer vs. the seller or be the same. For instance, a commission could be charged to both the buyer and seller for a trade that takes place at a market price, or the seller only, or the buyer only. The trading system can quote information such as the current bid/ask spread, the last matched trade price, etc.

The trading system can allow for 'fill or kill' trades for certain types of tickets where all the tickets are sold to a purchaser or group of purchasers, who has an identical number of tickets to be purchased as a ticket seller, or group of sellers, is trying to sell. In other words, the sale order is not executed unless the entire block of tickets can be sold (e.g., if only a portion of the tickets can be sold, the trade does not take place). This could likely apply to season ticket holders where they are selling specific seats that can not be dynamically moved around.

Patrons can place orders using terminology that is analogous to the terminology used for the stock markets. By using similar terminology to stock markets, the level of necessary patron training is significantly reduced and the likelihood of greater patron acceptance increased. Patrons have the choice of placing all kinds of orders including: market orders (sell or buy at current market price); good-till-canceled orders (sell or buy the ticket at a specified price until the trade is executed or the patron cancels the order); day limit order (sell or buy an ticket at a specified price for the duration of a specific day); stop-loss order (if the ticket's value falls to a specified level the ticket will be sold); and the like.

The foregoing features of the invention provide a great deal of flexibility in the benefits associated with the sale and exchange of tickets. For instance, the benefits can be categorized across two dimensions, namely different types of electronic tickets and different types of membership. More particularly, a ticket represents a set of rights the patron obtains as a result of owning a particular type of ticket. These rights can be bundled in three different categories, standard tickets, restricted tickets, and temporary tickets.

Standard tickets are fully tradable with no restrictions, and allow the owner complete control and discretion over how the ticket is ultimately used (e.g. enter the venue for the event, trade the ticket at market value, or assign the ticket). Also, standard tickets include the applicable ticket property rights that are inherent to the specific ticket purchased, as described hereinafter.

Restricted tickets only provide access to an event for a patron. These restricted tickets might typically be used in the following situations: college students at college athletic events, employees of the venue or promoter, fan club members for certain entertainers, and the like. Restricted tickets can also be used for promotional give-aways, selling tickets to events where a face value or a discount to market value is desired by the entertainer/promoter, reserved tickets for certain patrons, etc. Restricted tickets allow patrons access to the event and possibly select property rights such as parking, but they do not possess any other typical ticket rights. Restricted tickets could be inhibited from being traded on the secondary ticket market.

Other restrictions, as deemed necessary, could also be placed on restricted tickets. For example, since the venue owner will probably not want to provide an incentive for permanent seat license (PSL) holders to retain their seat licenses and make unjustified profits by trading their tickets on a secondary exchange, the venue owner can restrict seating license tickets so that they can only be traded at their face value, rather than at market value. Venue owners could then provide seat license holders with an option to sell their seating license back to the venue owner or continue holding their seating license and all the rights the seat license includes.

Temporary tickets can be used for special circumstances. Three exemplary types of temporary tickets include gift tickets, event tickets, and sub-account tickets. Gift tickets can be made available for members and non-members to give to a party of their choice. Event tickets are tickets for patrons who are not members of the system but still want to attend an event. Sub-account tickets can be used by families (or groups or acquaintances) who often attend events together and do not want to have a large number of membership numbers that have to be entered every time they purchase a group of tickets to sit together. Sub-accounts are linked to a member's primary account. For example, a member may be assigned the membership number "0001" for the primary account. The various sub-accounts under that primary account are then designated by the numbers "0001-01", "0001-02", "0001-03", etc. The owner of the primary account has control over all of the sub-accounts, and all charges made on the sub-accounts, if permitted, are assessed to the primary account.

Temporary tickets can have the following privileges associated with them:
  ability to bid for general admission tickets for any event initially sold on the system. Patrons who are not members of the system are not entitled to place a bid for any tickets other than general admission tickets;

ability to buy and sell any tickets for events that are traded on the system's secondary market. Sub-account tickets under a full-time member may not have these trading privileges;

entry into the venue, if a ticket is owned;

all property rights (e.g., guaranteed parking, etc.) associated with the ticket the patron buys for that particular event.

In addition to different types of tickets, different categories of full-time membership can be offered. A basic membership can provide the following privileges:

ability to bid for tickets for any event initially sold on the system. This includes general admission, season tickets, luxury boxes, etc.;

ability to buy and sell any tickets for events that are traded on the secondary market on a member's own account;

entry into the venue, if a ticket is owned;

all property rights (e.g., guaranteed parking, etc.) associated with the type of ticket the patron buys for that particular event;

ability to select and rank personal seating preferences and then have these seating preferences considered when seats are assigned;

lower transaction fees when purchasing tickets;

ability to use the membership card to purchase merchandise and concessions at the venue at selected concession and merchandising booths;

participate in promotional offerings during an event by the venue owner such as special discounts, two-for-one promotions, etc.

In addition, members can pay an annual fee which entitles them to a higher, or premium, level of membership. Premium members can enjoy the following additional membership privileges:

ability to participate in co-promotional activities for relevant products such as sporting goods, clothing, and the like. Patrons may be entitled to cash discounts at affiliated shopping outlets;

free services that are offered by strategic alliance partners, such as Internet-based sports services, and the like;

random drawing promotional activities where the patron will have the ability to win back-stage passes, meet with the entertainers/players, etc.

The following types of devices, with their related privileges, can be used for entry into each of the affiliated venues:

Smart cards, PDAs, wireless telephones, contactless cards, bar-coded and magnetic stripe cards, RFID devices, biometric features, and the like can be used by full-time members, regardless of the type of membership. The devices can be used to: (a) provide entry into the venue, (b) provide entry into guaranteed parking, (c) allow patrons to purchase either merchandise or concessions at the venue; etc.

any of these types of devices can be employed for all non-members who want to attend an event at a venue that uses the system's services. This includes gift certificate cards (gift tickets), affiliate cards for full-time members (sub-account tickets), and infrequent patrons who want to purchase their tickets on an event-by-event basis (event tickets), rather than become full-time members. The privileges associated with these tickets comprise entry into the venue and any related property rights that are associated with the type of ticket the patron owns.

Membership rights and privileges are distinct from ticket property rights. Ticket property rights are particular to a specific event and constitute the basic commodities that can be purchased and traded by members of the system. Tickets are not physical in nature, but rather they are electronic proxies for the associated rights. Membership rights are benefits that the patron receives, and these rights can not be traded. Membership rights vary by the type of membership the patron possesses.

Ticket property rights are linked to a patron's membership. This link is unique and each membership is only allowed one set of ticket property rights for each individual event. The ticket has all the property rights associated with conventional physical tickets, plus more. Identical to physical tickets, ticket property rights authorize entry into the entertainment event. This is the most basic of property rights. Tickets might also possess other property rights such as entry into guaranteed parking, entry into luxury boxes, and various benefits provided by the venue owner at the venue.

Season tickets present a specialized case of the general situation described thus far. Whether season ticket holders have purchased a seating license or not, there is likely to be a general feeling by season ticket holders, and even venue owners, that having a season ticket entitles that individual to priority on buying a season ticket the following season, even though it is a new season. While this property right is perceived rather than actual (other than in the case of seat licenses), a value can be attributed to this right without jeopardizing the intangible goodwill this inherent right conveys to season ticket owners. If this inherent property right does not continue, existing season ticket owners might feel that the goodwill they have demonstrated for a franchise (e.g., purchased season tickets in good and bad times) has not been acknowledged or rewarded.

Existing season ticket owners will likely want to be differentiated from new bidders for season tickets, rather than be considered just another person in a pool of bidders. In fact, it is likely that season ticket holders will want to be differentiated in a way that is directly beneficial to them.

For those venue owners who want to provide such an inherent property right to their existing season ticket owners, the following approach can be employed. All patrons who are interested in renewing their season tickets for their current quality of seat section can be required to submit a bid during the market making process. By requiring all interested patrons (e.g. existing and new) to submit bids for season tickets, venue owners will obtain a more robust market value for the tickets. Once the market value is determined for a particular section's season tickets, existing season ticket holders from prior years who did not bid enough to meet or exceed the market value price for the tickets, but did bid enough to be within a predetermined percentage of the fair market value, would have an option (e.g. right of first refusal) to renew their season tickets at the fair market value. The existing season ticket holders have a limited period of time following the closing of the bidding window to exercise this option. By encouraging existing season ticket holders to be within a certain percentage, e.g., 20%, of the fair market value price, the existing season ticket holders will likely submit a bid that is reasonable. When an existing season ticket owner's bid is not reasonable (e.g., within 20% of the fair market value), it is probably fair to expect that the existing season ticket owner should lose this valuable inherent property right, since he or she was likely understating the bid. Conversely, those existing season ticket holders who bid at or above the market value receive their tickets automatically. If a season ticket holder does not continue to purchase a season ticket, or changes the quality of seat from the prior season, this option ceases for future seasons.

The electronic ticket can provide parking privileges identical to those which are conventionally offered. The parking property right travels along with the ticket being purchased/sold, so that the owner of the ticket in question also owns the parking property right. In other words, the parking right is bundled with the entry property right for certain tickets.

As discussed previously, the parking attendants can have radio frequency readers 36 that allow the attendants to instantaneously read a membership identification device and also determine whether the member has parking privileges. As vehicles enter the parking area of the venue, the patrons provide their membership devices to the parking attendant, who reads the device with the reader. Alternatively, the device could be placed on the dashboard of the vehicle or hung on the mirror, and be automatically read while it remains in the vehicle. The reader communicates with the local payment server 32 and sends back a verification notice that this particular ticket holder is entitled to park in the parking area. As the patrons enter the parking area, the parking attendant can provide the patrons with physical markers indicating that they are allowed to park in a reserved area, if desired.

As with the electronic tickets used for entry into the venue, this form of electronic ticket for parking results in increased liquidity and transferability of ticket property rights. Once a patron enters the parking area, he or she will lose the ability to trade the ticket since a portion of the property right that is affiliated with the ticket for that particular event has been used. This property is akin to that of a ticket holder who actually enters the venue itself; once a patron enters the venue all trading privileges for the ticket cease and desist.

Playoff tickets present another type of special case. Regular season ticket holders might be upset if, at the end of a season, they are required to reenter a normal ticket pool and bid for the opportunity to attend playoff games after they have spent an entire season attending games and they are required to reenter the bidding process for purchasing tickets to playoff events. As part of a season ticket package (e.g., to give people a reason to purchase season tickets), the venue owner can provide all season ticket purchasers with the right to purchase playoff tickets (at a fixed face value or discount to market value for their particular season ticket seat—akin to conventional preprinted face values) for the team's playoff tickets for each phase of the playoffs. The face value price or level of discount to market price for each ticket could increase or decrease, respectively, with each round of the playoffs.

By providing this option to purchase pre-priced playoff tickets to season ticket holders only, it allows the venue owner to significantly differentiate the season ticket package from general admission tickets. Although there is always a tradeoff between selling the option and collecting the option value and strike price vs. waiting to see if the venue owner's team makes the playoffs and selling the tickets at their actual market value, the venue owner strongly differentiates season tickets from general admission tickets by providing this property right at the beginning of the season. Also, since this option can not be split up over various games, it is a unique ticket property right for season ticket holders only.

The option to purchase playoff tickets for season ticket holders can automatically be part of the season ticket's property rights, translating into a higher market value on season tickets for the venue owner. This higher initial ticket market value in turn results in higher ticket sales proceeds to the venue owner upon the initial sale of tickets to patrons, irrespective of whether the team makes the playoffs.

There are many incentives for patrons to provide each patron's membership number when purchasing tickets for a group of people rather than using sub-accounts, including the ability for each patron to use their membership device at the venue to make purchases, lower transaction fees, ability for each patron to control a ticket when the ticket is linked to a unique membership number, etc. It may also be desirable to make it easy for patrons to do so rather than having to memorize or collect all of the membership numbers prior to placing an order.

At the time a patron registers, or at any point in the future thereafter, each patron can have the ability to list the name and membership numbers of other members for whom they will typically purchase tickets or provide notification that they have extra tickets available. This can be done by the patron knowing and directly entering the other members' required information, or by providing an inquiry and search capability where the person building the list can enter certain critical information (e.g., name, address, member number, etc.) that will search the database 22 and provide a list of potential matches, allowing the patron to select the list members based upon the results of the search. Including other members on a given patron's list will only allow the owner of that list to purchase a ticket for another member, but not to sell tickets, purchase concessions, etc. All members placed on someone else's list can be notified that a certain member has included them on a list of likely persons for whom a ticket is to be purchased.

Approval for inclusion on any member's list must be provided by the member being named on the list before the corresponding billing and electronic ticket property rights can be directly assigned to the list member. Only after inclusion on a list is approved by the list member can the list member be billed for charges incurred as a result of the primary member's order. Also, electronic ticket property rights are not assigned without approval. However, electronic ticket property rights can be transferred from one member to another at any point in time after an electronic ticket is purchased.

If a member places an order for another member, and the member for whom the electronic ticket is being purchased has not yet approved his or her inclusion on the purchasing member's list, then the member who is placing the initial order or secondary trading order is billed for all acquired 'unapproved' electronic tickets with all property rights associated with each unapproved electronic ticket defaulting to one of the order placer's subaccount numbers. This means that all electronic tickets (order placer's electronic ticket, intended subaccount electronic tickets, and unapproved electronic ticket orders), other than properly approved list orders, will be billed to and be under the control of the member placing the order, although the property rights for each electronic ticket will be assigned to individual member and subaccount numbers.

In addition to the primary member's approach outlined above for placing other members on a list, the list members can themselves send a request to be automatically added or deleted from any list at any point in time. In addition, the primary member can, with or without approval from a list member, remove any member from his or her list.

Whether a member is placed or elects to be placed on another member's list, the member being placed on the list has the option of approving his or her inclusion on another member's list for only one specified event or for any event. If the member is only approved for a particular event, once the event is complete that member's information disappears from the order placer's list.

Members are also able to create, name, and combine unlimited numbers of list members who typically purchase electronic tickets or receive notifications together. Many email programs allow 'group mailings' to be predefined today. This grouping might consist of a group of family or friends that typically attend events together, a grouping of a company's favorite clients for entertainment purposes, etc. The ticket exchange system keeps a history for each list member showing how many notifications, electronic ticket purchases, electronic ticket transfers, etc. the primary member has carried out for that particular list member.

When a patron purchases an electronic ticket for a list member, an automatic list dialogue box appears, showing (a) the primary member's list members, (b) an indication whether the list members have been approved or are pending approval, and (c) whether they are approved for a specific or any event. The list member's membership number need not be shown on the list when placing orders because patrons do not typically know (or care about) their list members' membership number, other then when originally developing their list. However, the system stores a corresponding membership number in the background for each list member shown on a list. As an example, one list members listing in the dialogue box could be "John Smith—Any" or "John Smith—MLB-NYY0712" (particular event identifier).

The list prioritizes the order in which list members are listed, based upon how many electronic tickets the primary member and list customer have purchased for each other in the past or if the list member has been identified for a particular event for which the primary member is currently placing an order. The primary member can place an order for his or her own electronic tickets and then either tell a call center operator or use the Internet to click and drag members of the list into their order box if they are ordering more than one electronic ticket. The maximum number of sub-accounts can be included at the bottom of the list box as well, so members can click and drag sub-account numbers if they desire. Once an order is placed and executed (electronic tickets are purchased), the primary member and all list members can be notified of the order either via email, a toll-free or toll-bearing telephone number that is menu driven, an automated telephone calling service, first-class mail, or the like. The primary member will also have a record of the order at the time the original order is placed.

By means of the features provided by the system, patrons have an option to select whether they want to purchase electronic tickets for other patrons (as outlined above), or notify other patrons that they have electronic tickets available to be used for an event. While the system's notification service will most likely be used by corporate electronic ticket holders, all members will have the opportunity to use this notification service. In the case of the notification service, approval by the list member is not required to be included on the primary member's notification list. Of course, members would want to encourage their list members to be registered members prior to placing them on their notification service list, however the primary member could still list a non-member on their notification service list. If this non-member were to eventually use the primary member's electronic ticket, the non-member would have to use a temporary electronic ticket.

When subscribing to the system's notification service, members and their list members will follow the same approach that is outlined above for entering the required information for each list member. However, the required personal information for the notification service will also include the list member's contact information such as an Instant Messenger ID, email address, pager number, and the like, depending upon the method of communication the list member prefers for notification. In addition, if the method of notification allows, each primary member will be able to customize a number of notification announcements and select the announcement they wish to use for each notification. If the primary member does not want to customize the message, a default announcement can be employed, such as "Company XYZ would like to offer you X free electronic tickets to 'event name' on 'event date'. If you are interested and able to use these electronic tickets, please call xxx-xxx-xxxx or email us at xxxx@yyyy.com. Thank you."

Notification of electronic ticket availability can be done prior to selling or assigning electronic tickets to a notice service list member. However, assigning or selling an electronic ticket to any list member by the primary member is preferably only done by the primary member himself or herself. In other words, the system facilitates the notification service, while all transactions for electronic tickets are executed by members themselves. Members are able to prioritize the order in which their notification service list members or group of members are listed in their notification service list dialogue box. This provides each primary member with the ability to use their own criteria for ranking list members for their notification service.

The overall flow of operations that occur within the electronic ticket exchange system is illustrated in FIGS. 5-8. FIG. 5 depicts the events which occur in connection with an initial ticket offering. At step 60, information regarding an upcoming event is published, and a bidding window is opened at step 62. Once the window has closed, the market system 50 determines the initial ticket prices for each level of seating at step 64. For each patron whose bid was at or above the established price, the payment system 24 debits the patron's account at step 66, and an electronic ticket token is transferred to each such patron's account. The outcome of the initial ticket offering is then communicated to the successful bidders, at step 68.

FIG. 6 illustrates the operations that take place subsequent to the initial offering. At step 70, patrons initiate the sale or purchase of tickets on a secondary market made available through the trading system 52, by any of the available access mechanisms of the patron interface 10. When a match occurs, the payment system validates the buyer's ability to perform the transaction, and then appropriately credits or debits the members' accounts at step 72. The trading system 52 completes the transaction by moving the electronic ticket token(s) from the seller's account to the purchaser's account, at step 74. The market system 50 is updated at step 76, to reflect the executed trade information.

Figures 7, 8:
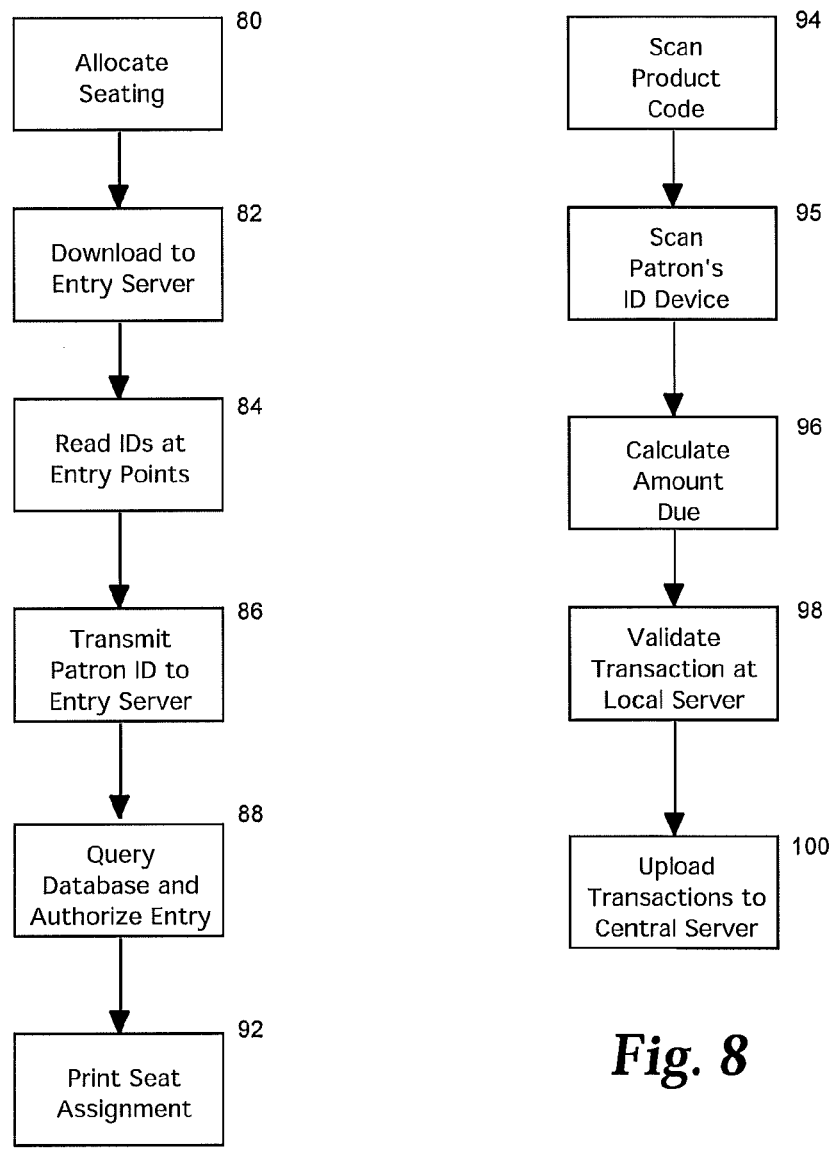

FIG. 7 illustrates the operations that occur at the initiation of the event. At step 80, seating system 48 determines an optimal configuration for all of the tickets that have been sold. This configuration is downloaded to the entry system server 40, at step 82. As additional tickets are sold or exchanged during this time, the entry system server is updated with the appropriate seating information. Once the venue opens its gates, patrons use their identification devices to enter the parking facilities and the access-control mechanisms, at step 84. Once a device is employed at any of these points, the member identification is transmitted via a reader to the entry server at step 86, which forwards the information to the central server 26 at step 88, to prevent any further trading of the electronic ticket. The entry server 40 queries the patron's account to see if an electronic ticket token is present for the event, and authorizes access to the parking facilities and the venue, as appropriate. In those situations where seats are assigned, as the patron's identification device is read at the access-control mechanism 42, the seating map 20 is checked and the printer at the access-control point produces a physical seating assignment for the patron, at step 92.

FIG. 8 depicts operations that can occur during the performance of the event. At steps 94 and 95, a concessionaire can scan a member's identification device and the universal product codes for purchased items. The price of each item is retrieved from a database at step 96, and the total amount due is calculated. This amount is provided to the local payment server 32 at step 98, where the transaction is validated. The individual transactions are queued at the local payment server, and uploaded to the primary payment server 28 at step 100.

In the foregoing example of the invention, most of the operations are carried out at a central facility, and a portion of the processing occurs at the individual venues. It will be appreciated, however, that the processing load can be configured in different manners. For instance, all operations could be performed at the central location. In this case, the access-control devices and the readers communicate directly back to the central server 26. This approach may be feasible in a situation where the communication links between the venues and the central location are reliable and capable of operation at high speeds.

From the foregoing, therefore, it can be seen that the electronic ticket exchange system of the present invention offers a number of advantages to both the venue owner and the patron. Venue owners will be able to earn optimal total income yield for each event at the time tickets are sold. For popular events, laws of supply and demand will likely result in a higher market value for tickets upon initial sale, resulting in the venue owner receiving this money, not a ticket broker/scalper. Increased access and liquidity of tickets for each game and season tickets will likely result in a higher ticket market value. Season ticket holders have a liquid and market-driven alternative when they can not attend an event due to work, travel, or other personal reasons, likely resulting in their willingness to pay more for a season ticket. The same is true, but to a lesser extent, for general admission tickets.

Venue owners will be able to earn incremental money from event marketing investments because they can now measure incremental seats and market price change in tickets directly. Enhanced franchise value results from the patron paying a fair market value for enjoying the entertainment. Patrons more likely to feel like they received a fair deal. Significantly enhanced experience for patrons will likely create increased value in the entertainment franchise's intangible goodwill.

Venue owners will significantly expand their potential patron market for each event because all potential patrons, whether full-time members of the system or not, will know that when they want an ticket for an event at one of the affiliated venues, they can simply go to the system to investigate event details such as timing, entertainers, cost per ticket for each quality of seat, etc. This comfort in obtaining a fair market value for the tickets and 100% accessibility will result in patrons who did not previously know how to obtain tickets being able to knowingly investigate and potentially purchase a ticket.

The size of potential patron base will be increased as a result of increased word-of-mouth due to market value pricing for lesser-known acts' tickets. Because lesser known acts will likely have a lower market value (vs. overpriced face value) for their tickets, it is likely that the base of patrons willing to pay a lower market value will increase. The venue owner will be better able to build patron loyalty, as well as significantly develop and enhance patron loyalty programs. The venue owner will also have significantly increased access to information on patron's purchasing behavior and demographic statistics. This can result in increased effectiveness of event promotional and marketing efforts as a result of improved demographic information and ability to effectively direct market. Such information provides a stronger case to demonstrate when a community does or does not support a franchise, and hence take necessary actions.

The system also provides increased venue yield management for both popular and less popular entertainment events. Due to the fact that the venue owner is selling attendance, rather than merely selling seats, the venue owner should experience increased economic benefits from additional patrons attending events and paying for parking, concessions, merchandise, and the like. The venue owner will have more leverage with merchandise and concession vendors due to increased yield management of venues. More people are likely to attend an event due to a more efficient (information and transaction cost) secondary market for tickets. In addition, the nuisance effect from physical ticket scalpers is eliminated.

Patrons of entertainment at venues experience benefits as well. For instance, patrons can buy/sell/trade tickets for any event on a worldwide ticket exchange, resulting in complete information and an efficient market. Price gouging or limited information will no longer exist. At all times, every patron knows that they only have to pay a fair market value for any ticket to any entertainment event. Certain events will be more affordable for patrons to attend, expanding access to live entertainment events to the general population. Membership loyalty benefits will transfer across entertainment events and venues.

Increased access to all events will result since patrons can purchase a ticket for any entertainment event as long as they are willing to pay a fair market value. No longer is purchasing a ticket solely a function of: (a) personal contacts, (b) a rapid dial telephone, or (c) one's time availability to stand in a queue.

Patrons will have the ability to place bids for any season ticket for any quality of seating section. As long as the patron is willing to pay a fair market value for their season ticket, the patron can always improve upon existing season ticket seating quality. Timing of bids can be casual, since they can be changed prior to final submission, and they can be entered over a period of time, eliminating the hassles of queuing. Increased liquidity for entertainment event tickets results, since the telephone and internet will provide anyone with the opportunity to buy/sell/trade tickets for any entertainment event, without geographic constraints. The process for purchasing tickets goes from a very arduous process of waiting in queues, rapid dialing telephones, and frustration at selection to one of complete access and excitement.

Increased liquidity of tickets adds convenience to both event and season ticket holders, in that they are able to sell a ticket in the future if necessary (e.g., can not attend due to other commitments, work, etc.). This additional convenience will increase the patron's likelihood of bidding for certain events and providing a fuller assessment of their perceived market value for the event. Specific patron preferences can be acknowledged through venue and third-party direct marketing efforts if the patron desires.

Property rights that often accompany tickets such as guaranteed parking, restricted seating, etc. can all be transferred with the electronic ticket and linked to a specific membership. Actual concession and merchandising preferences can be taken into account in a real-time fashion when providing the goods. Instead of having a physical ticket system that functions like cash (e.g., bearer-bond market) and has the accompanying risk of loss, theft, damage, counterfeit, etc., the electronic ticket is much more secure and based upon a patron membership and personal identification number. The use of electronic tickets also enhances the security element of the system.

It will be appreciated by those of ordinary skill in the art that the present invention can be embodied in other specific forms without departing from the spirit or essential characteristics thereof. For instance, in a preferred implementation of the invention, all of the various components described herein are integrated into a comprehensive electronic ticket exchange system. However, individual aspects of the system can be selectively employed without using other features described herein. For example, the market-making mechanism can be employed in conjunction with a paper ticket system, to establish an initial sale price for the tickets that enables the venue owner to receive the true market value for the tickets. Thereafter, the paper tickets can be handled in a conventional manner. In another implementation, electronic tickets can be sold at a pre-established face value, i.e. without initial bidding, and thereafter traded on a secondary market. Similarly, the dynamic seat assignment can be an optional feature. For instance, seats can be assigned at the time the tickets are purchased, e.g. upon notification that an initial bid was successful, rather than await an optimal configuration at a time closer to the start of the event. Other variations of the features of the system will also be apparent.

Furthermore, in a preferred implementation, the electronic ticket exchange system of the present invention is employed in connection with all of the tickets for every event at a venue. In some cases, however, it may be preferable to employ the system in a selective manner. For instance, tickets may be sold and exchanged through the system for certain events, e.g. special, non-recurring events such as concerts, shows, etc., but not for other, more regular events. In another implementation, the features of the system can be selectively used for certain qualities of seating, such as season tickets and suites, while using more conventional ticketing approaches for general admission tickets. Alternatively, the system might be employed for only those tickets which are not sold by the venue's box office. Other variations in the implementation of the invention are also possible.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A system for selling and exchanging electronic tickets for entertainment events, comprising:
   a patron interface via which a first patron purchases an electronic ticket for an entertainment event at a venue from a vendor;
   a database storing:
   (i) identifying information about at least the first patron and a second patron, and
   (ii) a token representing the electronic ticket purchased via said patron interface by the first patron, said token being associated with the identifying information about the first patron that is stored in the database;
   a trading system via which the electronic ticket for the entertainment event that was purchased by the first patron, and represented by the token stored in said database, can be transferred by the first patron to the second patron, wherein the association of said token is transferred from the identifying information about the first patron to the identifying information about the second patron within said database;
   a payment system that stores profile information regarding at least an account of the first patron and an account of the second patron, and that is configured to:
   (i) automatically debit the account of the first patron for the purchase of the electronic ticket,
   (ii) automatically credit the account of the first patron when the electronic ticket is transferred to the second patron via said trading system, and
   (iii) automatically debit the account of the second patron when the electronic ticket is transferred to the second patron via said trading system; and
   an entry system having at least one access control device with a reader at the venue of a current event, which is responsive to presenting of identifying information pertaining to an entering patron at said reader to:
   (i) communicate with said database to determine that the presented identifying information pertaining to the entering patron is associated with the token representing the electronic ticket for the entertainment event which is the current event, and
   (ii) in response to said determination to automatically provide the entering patron who is determined to be associated with the electronic ticket with physical access to the venue at which the entertainment event is being presented.

2. The system of claim 1, further including a seating system which determines an allocation of seats at said venue for electronic tickets for the entertainment event.

3. The system of claim 2, wherein the seats are allocated on the basis of preferences submitted by the patrons.

4. The system of claim 2, wherein said entry system provides patrons with an identification of seats that are allocated to their electronic tickets at the time that entry is provided by said access control device.

5. The system of claim 1, wherein said payment system automatically debits the account of the entering patron for purchases of items made by the entering patron at the venue.

6. The system of claim 1, wherein said presented identifying information is presented to said entry system by an identification device.

7. The system of claim 6, wherein said identification device is also used to provide access to facilities associated with the venue.

8. The system of claim 7, wherein said facilities include parking sites.

9. The system of claim 6, wherein said identification device is also used to purchase items at the venue.

10. The system of claim 6, wherein the identification device is selected from one of the group comprising wireless devices, PDAs, smart cards and magnetic cards.

11. The system of claim 6, wherein said identification device contains data that identifies the entering patron as a member of an organization affiliated with said system for selling and exchanging electronic tickets.

12. The system of claim 1, wherein the venue contains plural levels of seating quality, and said trading system establishes a respective market for each level of seating quality of the plural levels of seating quality.

13. The system of claim 1, further including a market-making system which establishes a price for entertainment event tickets based upon bids submitted by patrons.

14. The system of claim 1, further including a notification system which automatically provides a notification to individuals that a patron has purchased tickets to an event and such tickets are available to be transferred to said individuals.

15. The system of claim 1, wherein said patron interface enables patrons to purchase tickets to entertainment events for both themselves and other patrons as part of a group transaction.

16. The system of claim 1, wherein said patron interface enables patrons to enter information which authorizes them for access to at least one entertainment event, said database stores said information regarding the patrons who are authorized for access to said at least one entertainment event; and said entry system checks the information stored in said database to determine whether a patron is authorized for access to said at least one entertainment event, and permits those patrons who are authorized to enter a venue at which the at least one entertainment event is being presented.

17. A method for electronic ticket exchange and access control to events, comprising:

receiving information regarding an electronic ticket purchased by a first patron, via a patron interface, for an event at a venue, and storing a token representing the electronic ticket purchased by the first patron in a database, said token being associated with identifying information about the first patron that is stored in the database;

automatically debiting an account of the first patron, in a payment system, for the purchase of the electronic ticket;

receiving information at a trading system that the first patron has transferred the electronic ticket to a second patron, and transferring the association of the token from the identifying information about the first person to identifying information about the second patron in said database;

automatically crediting the account of the first patron and debiting an account of the second patron in said payment system for the transfer of the electronic ticket;

in response to receiving identifying information pertaining to an entering patron in a reader at the venue of a current event, communicating with said database to determine that the received identifying information pertaining to the entering patron is associated with the token representing the electronic ticket for the entertainment event which is the current event; and in response to said determination, automatically enabling an access control device of the reader to provide the entering patron with physical access to the venue.

18. The method of claim 17, further including the step of determining an allocation of seats at said venue for electronic tickets for the event.

19. The method of claim 18, wherein the seats are allocated on the basis of preferences submitted by patrons.

20. The method of claim 18, further including the step of providing patrons with an identification of seats that are allocated to their electronic tickets at the time that entry is provided to the venue.

21. The method of claim 17, wherein said received identifying information pertaining to the entering patron is presented to said reader by an identification device.

22. The method of claim 21, wherein the identification device is selected from one of the group comprising wireless devices, PDAs, smart cards and magnetic cards.

23. The method of claim 17, wherein the venue contains plural levels of seating quality, and further including the step of establishing a respective market for each level of seating quality of the plural levels of seating quality in said trading system.

24. The method of claim 17, further including the step of establishing a price for entertainment event tickets based upon bids submitted by patrons.

25. The method of claim 17, further including the step of automatically providing a notification to individuals that a patron has purchased tickets to an event and such tickets are available to be transferred to said individuals.

\* \* \* \* \*